July 30, 1968   J. W. WOOD   3,394,503
APPARATUS FOR SHARPENING COTTON PICKER SPINDLES
Filed Feb. 23, 1966   2 Sheets-Sheet 1

INVENTOR
JOHN WESLEY WOOD

BY *Arnold D. Gulko*

ATTORNEY

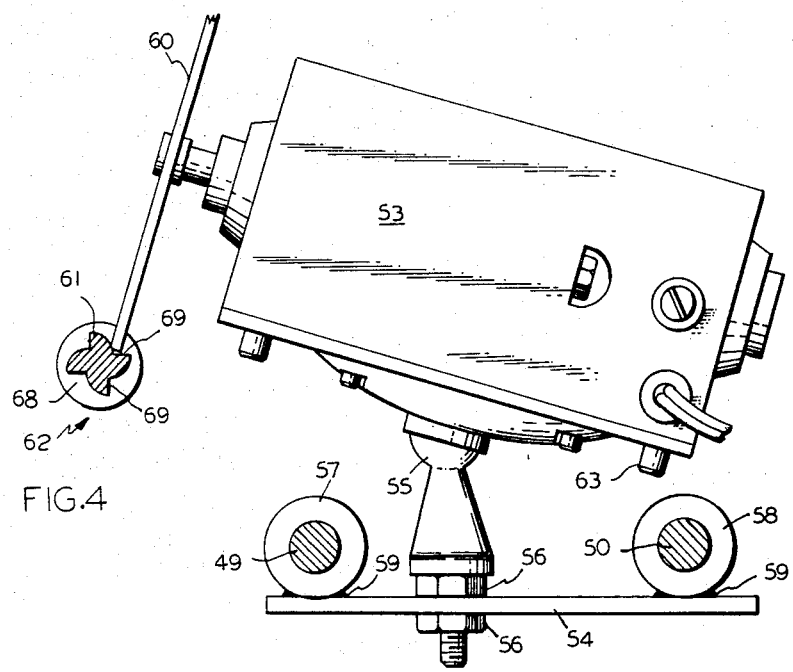
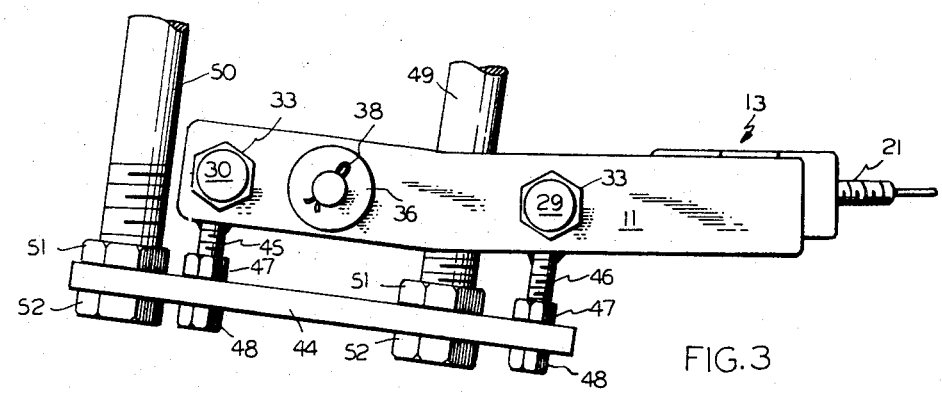
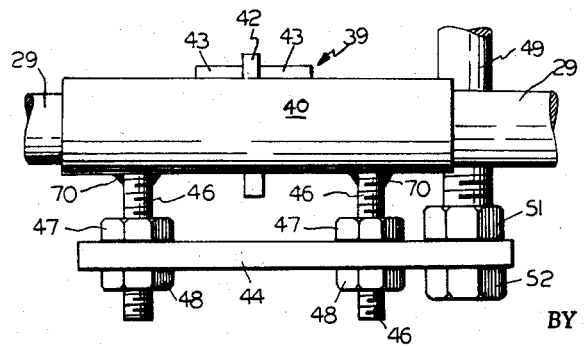

United States Patent Office 3,394,503
Patented July 30, 1968

3,394,503
APPARATUS FOR SHARPENING COTTON PICKER SPINDLES
John W. Wood, Rte. 2, Benson, N.C. 27504
Filed Feb. 23, 1966, Ser. No. 529,274
6 Claims. (Cl. 51—241)

ABSTRACT OF THE DISCLOSURE

The teeth of the cotton picker spindle are sharpened while they remain attached to a picker bar on a picking drum by means of apparatus which is secured by means of rings to the uppermost and lowermost picker spindles on a picker bar. The apparatus includes a vertical guide which extends alongside the row of spindles on the picker bar and which carries a movably support thereon. A traversing mechanism is used to position the support at any desired point along the length of the vertical guide and a second guide is carried by the support, the second guide being adjustable so that it can be aligned with the line of the teeth on the spindle to be sharpened. The sharpening means used to sharpen the teeth is mounted on the second guide and is moved therealong in order to sharpen the teeth on the spindles.

---

The present invention relates to apparatus for sharpening the barbs or teeth of cotton picker spindles while these spindles remain associated with the picker drums on the cotton picker machine.

In the conventional type of cotton picker machinery, the picking mechanism usually consists of a pair of picker drums which are so positioned that the cotton plants pass between the drums as the units move through the field, said drums being provided with a plurality of rotating spindles for engaging the cotton boles.

Usually the spindles have barbs or teeth that quickly become dulled and frequent sharpening of the barbs or teeth or replacement of the spindles is a necessary part of maintenance. Such maintenance has been found to be exceedingly expensive since the spindles have to be disassembled in the field and must be individually replaced.

This necessity for frequent replacement of mechanical picker spindles has been one of the major problems encountered with machines of this character. The spindles are of inherently high cost since they generally consist of machined parts which have to be completely discarded. The time involved in replacing the spindles also is a very important factor in the maintenance cost of the machine. Generally, the task of removing the spindle involves operations which are at least tantamount to a complete general overhauling of the unit.

The invention permits the spindles to be sharpened without removing them from the picker so that sharpening of the dulled spindle teeth becomes an acceptable part of picker maintenance.

As is known, the spindle is formed with an inner end or shank which is mounted within a retaining shoulder and an outer tapered end which is formed with lines of peripheral teeth. These teeth are sharpened by grinding the forward face of the line of teeth with the periphery of a rotating grinding wheel which must follow the angle of the taper of the spindle. In view of this and in further view of the lack of some practical means of bringing the grinder to the task, it has been necessary to remove the spindles from the picker and mount them in a special holder which can be appropriately moved with respect to a stationary grinding wheel. This, as is known, is a sizeable task.

According to the present invention, apparatus for sharpening the teeth of a cotton picker spindle while the spindle remains attached to a picker bar on a picking drum includes opposed end brackets which carry securing rings for connecting the brackets to the uppermost and lowermost picker spindles, respectively, (usually to the shoulders thereof) on the picker bar. The end brackets extend to the side of the securing rings and vertical guide means extend between the end brackets to position the guide alongside the row of spindles to be sharpened. Support means are movably mounted on the vertical guide and traversing means are used to position the support means at any desired point along the length of the vertical guide so that each spindle on the picker bar may be sharpened. The support means carries a second guide which projects in a direction parallel to the line of the teeth on the spindle to be sharpened. The sharpening means (normally a motor and a grinding wheel) is mounted on the second guide for movement along the line of the teeth to be sharpened.

Further, it is preferred to have the support plate angularly adjustable with respect to the plane of the vertical guide bars by means of positioning nuts so that the guide bars which carry the sharpener can be accurately aligned with the rows of teeth on the tapered picker spindles.

The invention will be more fully understood from the description which follows taken in conjunction with the accompanying drawings in which:

FIG. 2 is a section on line 2—2 of FIG. 1;

FIG. 3 is a top plan view of FIG. 1; and

FIG. 4 is a partial side elevation of the sharpening element positioned for sharpening the teeth of an appropriate picker spindle.

Figure 1:
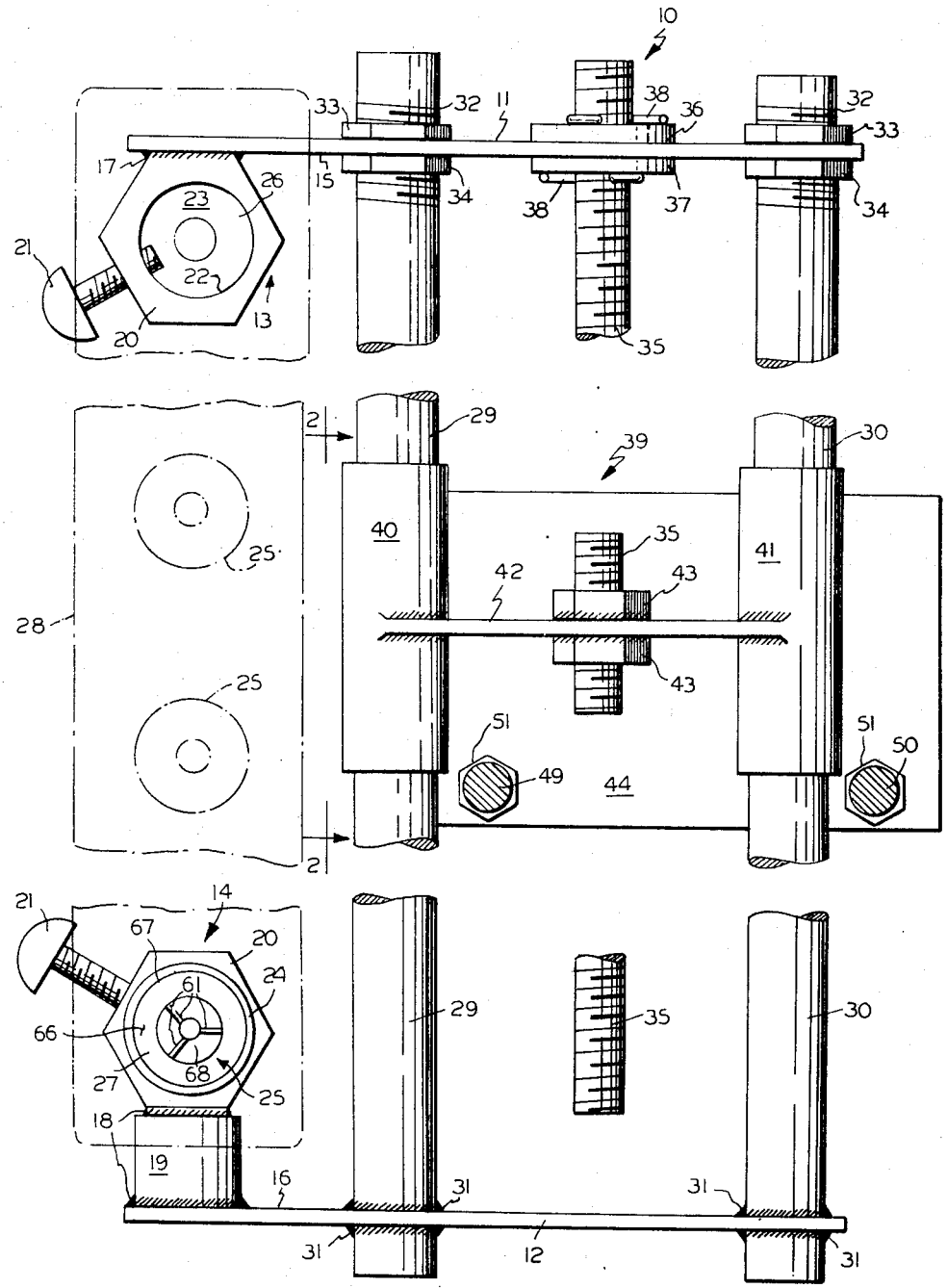
FIG. 1 is a front view with parts broken away and in section of sharpening apparatus, in accordance with the invention, the picker bar and spindle being shown in phantom.

Referring to FIG. 1, there is shown apparatus 10 for sharpening the teeth of cotton picker spindles while the spindles remain attached to a picker bar on a picking drum. The structure includes a pair of opposed end brackets 11 and 12, which carry securing rings 13 and 14 on the opposed facing surfaces 15 and 16 of the end brackets.

The securing ring 13 is secured as by welding 17 directly to the end bracket 11, while the securing ring 14 is desirably spaced from the end bracket 12 by means of a spacing block 19. The spacing block 19 is secured to the end bracket 12 and securing ring 14 by welds 18.

The securing rings 13 and 14 each include an annular housing 20 which threadedly carries a thumbscrew 21. The thumbscrew 21, when turned into the housing 20, extends past the inner surface 22 of the housing 20 and into the hollow interior area 23 thereof. In this manner, and when the securing rings 13 and 14 are fitted over the shoulder 24 of an appropriate spindle 25 as indicated in FIG. 1, the thumbscrew 21 may be turned into the housing 20 to bear against the shoulder 24 fitted therein to secure the rings and associated structure in position. In operation, the securing rings 13 and 14 are fitted about the uppermost spindle 26 and the lowermost spindle 27 on a picker bar 28, shown in phantom.

The end brackets 11 and 12 extend to the side of the securing rings 13 and 14. Spaced apart vertical guide bars 29 and 30 extend between the brackets 11 and 12. The end brackets 11 and 12 hold the guide bars 29 and 30 in spaced apart parallel relation, alongside the row of spindles on the picker bar 28. The guide bars 29 and 30 extend through openings in the brackets 11 and 12. The lower end bracket 12 is secured to the guide bars 29 and 30 as by welding indicated by numeral 31. The upper ends of the guide bars 29 and 30 are threaded, as indicated at 32, and held to the upper end bracket by nuts 33 and 34. In this manner end bracket 11 can be installed and removed when desired and accurately adjusted.

The end bracket 11 is further apertured to accommodate a traversing screw 35 which, in the preferred structure shown is intermediately positioned between the spaced apart guide bars 29 and 30. The traversing screw 35 extends through the end bracket 11, where it is held in position by means of washers 36 and 37 positioned on either side of the bracket and held in place by cotter pins 38 mounted in appropriate openings in the traversing screw 35.

The guide bars 29 and 30 carry a movable support mechanism 39. The support mechanism 39 includes a pair of bushings 40 and 41 which ride on the guide bars 29 and 30 for movement therealong. The bushings 40 and 41 are interconnected by a web 42 which spans the space between the bushings and is apertured to permit the traversing screw 35 to pass therethrough, so that the bushings and web can move vertically along the length of the guide bars 29 and 30 and screw 35.

The web 42 carries traversing nuts 43 secured to the web 42 on opposite sides of the aperture therein and the traversing screw 35 is threadedly connected to the nuts 43. As a result, rotation of screw 35 by means of a handle (not shown) functions to vertically position the support element 39.

Referring to FIGS. 2 and 3, a back plate 44 is secured by means of studs 45 and 46 to the bushings 41 and 40. Welding is used for the securement as indicated at 70. The studs 45 and 46 extend through openings in the back plate 44 where positioning nuts 47 and 48 enable the back plate 44 to be held in any predetermined plane with respect to the plane of the guide bars 29 and 30.

Back plate 44, in turn, carries a pair of motor support guide rods 49 and 50 which pass through openings in plate 44 and are secured in position by nuts 51 and 52 threaded onto the ends of the rods on either side of the plate 44 as shown. The guide rods 49 and 50 extend from the back plate 44 in a direction parallel to the line of the teeth on the spindle to be sharpened. This alignment being the purpose of the positioning nuts 47 and 48.

Referring to FIG. 4, there is shown a motor 53 pivotally secured, as by a ball joint indicated at 55, to a motor mount plate 54. The ball joint 55 is secured as by nuts 56 to the plate 54 as shown. The motor mount plate 54 is welded at 59 to bushings 57 and 58 which ride on the motor support rods 49 and 50. The motor 53 operates a grinding wheel 60 which functions to sharpen the teeth 61 of an appropriate picker spindle 62. When sharpening the teeth 61, the motor 53 is moved along the guide rods 49 and 50 carrying the grinding blade 60 the length of picker spindle 62. In the preferred embodiment shown, the motor is moved by means of a finger stop 63.

FIG. 1 shows the lowermost spindle 27 in full lines from which it will be seen that the picker-spindle 62 has a shank 66 which is mounted in shoulder 67 and a tapered forward end 68 formed with rows of teeth. Since the spindle rotates in a counterclockwise direction as pictured in FIGS. 1 and 4, the forward face of the teeth is the face which leads during rotation and this is the face which is ground, identified by numeral 69.

It is of interest to note that the picker spindle is a three-dimensional tapered configuration and thus the grinding blade 60 must not only move forward and back along the spindle, but vertically and laterally at the same time. In order to accommodate this motion, the ball joint 55 allows the motor 53 to pivot to provide the vertical movement, and the bushings 57 and 58 coact with the rods 50 and 49 to provide the forward and rearward movement. The lateral movement relative to the axis of the spindle is mechanically adjustable for each blade by means of positioning the back plate 44 in relation to the plane of the guide bars 29 and 30 and bushings 40 and 41. As noted hereinbefore the bushings 40 and 41 carry studs 46 and 45 respectively, which studs function to laterally position the plate 44 as noted hereinbefore.

Thus, the purpose of adjusting the nuts 47 and 48 on the studs 46 and 45 is to align the motor guide bars 49 and 50 with the line of the face 69 of the teeth on the spindle.

In operation, the sharpening apparatus is secured to an appropriate picking bar by means of the securing rings 11 and 12 which fit over a picker spindle and mount on the shoulders of the uppermost and lowermost spindles as noted hereinbefore. When this is done, the guide bars 11 and 12 are positioned alongside the line of spindles to be sharpened. The motor 52 may then be vertically positioned for each successive spindle to be sharpened by means of turning the screw 35 by its associated handle, not shown, and moving the movable mounting 39 and motor mounting assembly up or down.

The invention is defined in the claims which follow.

I claim:

1. Apparatus for sharpening the teeth of cotton picker spindles while they remain attached to a picker bar on a picking drum comprising, a pair of opposed end brackets, said end brackets carrying securing rings for connecting said brackets to the uppermost and lowermost picker spindles respectively on said picker bar, said end brackets extending to the side of said securing rings, vertical guide means extending between said end brackets and positioned thereby alongside the row of spindles on the picker bar, support means movably mounted on said vertical guide means, traversing means for positioning said support means at any desired point along the length of said guide means, second guide means carried by said support means and projecting therefrom in a direction approximately perpendicular to said first guide means and parallel to the line of the teeth on the spindle to be sharpened, and sharpening means mounted on said second guide means and movable therealong for sharpening said teeth.

2. Apparatus as recited in claim 1 in which said vertical guide means comprises a pair of spaced apart guide bars.

3. Apparatus as recited in claim 2 in which said support means comprises bushings slidable on said guide bars, threaded studs projecting from said bushings, plate means carrying said second guide means and positioning nuts on said studs on opposite sides of said plate means for adjusting the plane of said plate means with respect to the plane of said guide bars.

4. Apparatus as recited in claim 2 in which said support means includes bushings slidable on said guide bars and said traversing means comprises a traversing bolt connected to said bushings and engageable with a traversing screw extending between said end brackets.

5. Apparatus as recited in claim 1 in which said securing rings carry finger manipulatable tightening elements for fastening said rings to the shoulders of said spindles.

6. Apparatus as recited in claim 1 in which the lower securing ring is spaced from its associated end bracket by a spacing block.

References Cited

UNITED STATES PATENTS

| | | | |
|---|---|---|---|
| 1,958,947 | 5/1934 | Holliday | 51—249 |
| 2,183,348 | 12/1939 | Eastman | 51—241 |
| 3,101,574 | 8/1963 | West | 51—92 |
| 3,114,222 | 12/1963 | Elford | 51—34 |

WILLIAM W. DYER, Jr., *Primary Examiner.*

G. WEIDEN FELD, *Assistant Examiner.*